May 30, 1950          F. H. SODEN          2,509,655
SEMIRIMLESS SPECTACLE MOUNTING
Filed Aug. 31, 1948
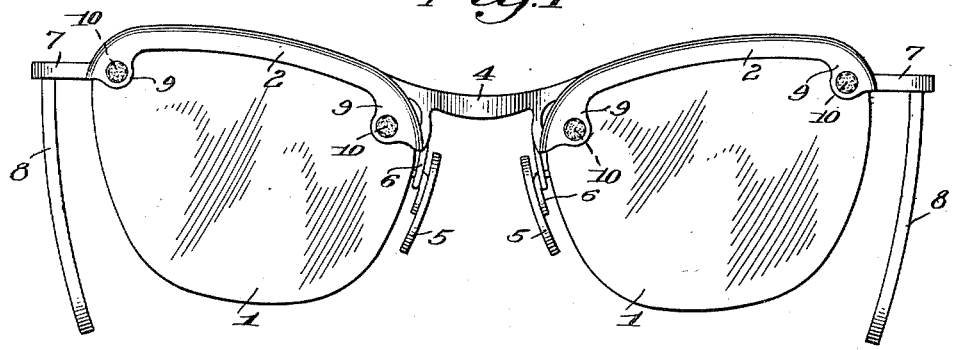
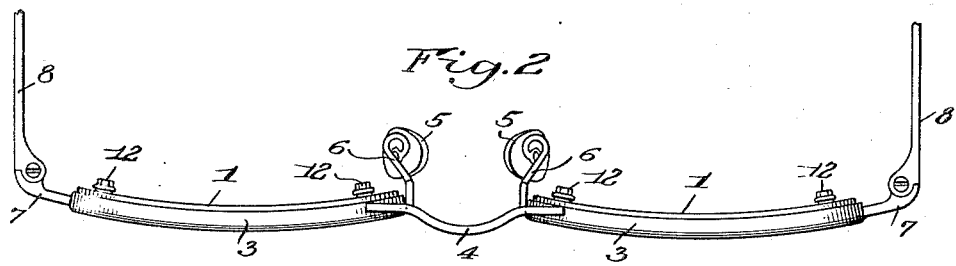
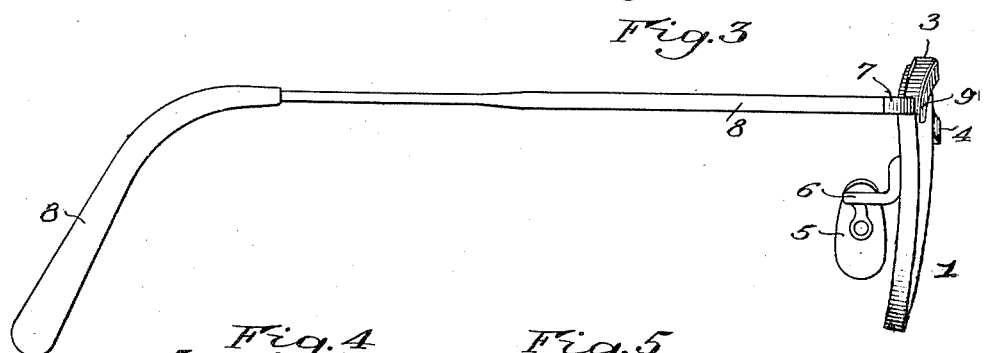
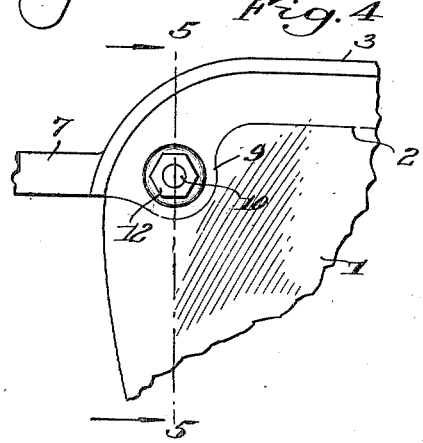
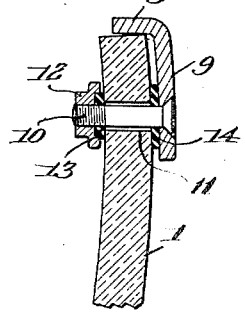
INVENTOR.
Frederick H. Soden
BY Harold E. Stonebraker
his Attorney Patented May 30, 1950

2,509,655

UNITED STATES PATENT OFFICE 2,509,655

SEMIRIMLESS SPECTACLE MOUNTING

Frederick H. Soden, Pittsford, N. Y., assignor to Continental Optical Company, Inc., Rochester, N. Y., a corporation of Indiana Application August 31, 1948, Serial No. 46,995

2 Claims. (Cl. 88—41)

This invention relates to a spectacle frame and has for its purpose to afford practical and efficient means for supporting lenses firmly and without danger of loosening or breaking, while at the same time presenting a pleasing and attractive frame.

A further purpose of the invention is to afford a structure that lends itself especially to a metal frame and presents the effect of a rimless or semirimless frame while retaining the strength, rigidity and lens holding characteristics of rims which entirely encircle the lenses.

Another object of the invention is to provide a strong and durable structure in which lenses can be easily fastened with accuracy in less time and with less care than is required with conventional types of frames.

An additional purpose of the invention is to support the lenses in such a manner that their top edges as well as the fastening devices and upper portions of the lenses are concealed and cannot be observed from in front of the wearer, thus avoiding the necessity of grinding the top edges of the lens accurately, and also permitting the front surfaces of the lens supporting arms to be engraved or otherwise ornamented, giving the effect of lenses with ornamental bands extending along their upper edges and no visible means of fastening the lenses to the arms.

Still a further purpose of the invention is to provide lens supporting arms that are so constructed as to protect the top edges of the lenses from breakage and to enable positioning the lenses easily against an edge engaging flange that centers them and insures their being arranged properly in relation to the attaching devices.

To these and other ends, the invention consists in the construction and arrangement of parts that will appear clearly from the following description when read in conjunction with the accompanying drawings, the novel features being pointed out in the claims following the specification.

In the drawings:

Fig. 1 is a front elevation of a spectacle frame constructed in accordance with a preferred embodiment of the invention;

Fig. 2 is a plan view of the same;

Fig. 3 is a side elevation;

Fig. 4 is an enlarged rear elevation, partially broken away, showing the lens fastening means; and Fig. 5 is a sectional view on line 5—5 of Fig. 4.

Referring more particularly to the drawings, in which like reference numerals refer to the same parts throughout the several views, 1 designates the lenses, each of which is mounted on a lens supporting arm or rim section that lies in front of its lens and extends slightly above and throughout the length of the upper edge of the lens, the rim section forming part of a brace-bar type of supporting structure.

Each lens supporting arm or rim section preferably includes a narrow depending vertical or front portion 2 that lies in front of and conforms to the upper edge of the lens, extending somewhat above the upper edge of the lens, and preferably terminating in a rearwardly extending lip or flange 3 which overlies the upper edge of the lens and conforms thereto. 4 designates a bridge that is rigidly and permanently connected to or formed as an integral part of the lens supporting arms 2, and provided with suitable nose pads 5 and supports therefor shown at 6. The supporting arms or rim sections are provided at their outer ends with extensions 7, to which the temples 8 are pivotally connected.

The lenses can be fastened to the supporting arms or rim sections in various ways in order to hold the lenses firmly, and so as to conceal the fastening devices and cover the upper front portions of the lens with an ornamental border, and to accomplish this, each supporting arm or rim section 2, which may be formed of metal or other suitable material, is provided at its ends with enlargements 9, and each enlargement 9 carries a stud 10 that preferably is fixedly attached to the arm 2 by welding, soldering, or otherwise, and extends inwardly through opening 11 formed in the lens, and is threaded at its inner end where it projects beyond the inner face of the lens.

12 designates a nut in threaded engagement with the inner end of the stud 10, and acting to hold the lens firmly in place on the supporting arm.

The stud 10 may be loosely attached to the arm, and when fixed thereon or integral with the arm 2, its front face lies flush with the front surface of the arm 2 which can be coated with any suitable metal or surfacing material and engraved or ornamented, so that the stud is not visible from the front and only an attractive, ornamental band can be seen extending along the upper edge of each lens.

Instead of the nut 12 engaging the inner end of stud 10, any convenient means can be adopted for engaging the end of the stud and the lens to hold the latter in place on the arm. The nut 12 preferably has a seat or recess formed in its outer face to receive a rubber or resilient washer 13 surrounding the stud and located between the lens and the nut while 14 designates a similar washer surrounding the stud 10 and located between the outer face of the lens and the supporting arm. The washers 13 and 14 serve to hold the lens securely in place, but so cushioned on both faces as to obviate likelihood of fracture, while permitting such relative movement of the lens in relation to the stud as may be permitted by the size of the opening through which the stud passes.

Each lens is assembled on its supporting arm by bringing the openings in the lenses into registry with the studs 10, sliding the lens onto the studs, and then tightening the nuts 12. With this construction and assembly, it is unnecessary to grind the upper edges of the lenses to a fine degree of accuracy since the upper edge of the lens is concealed from view by the flange 3 on the arm, which serves to protect the edge of the lens against breakage and to assist in positioning the lens as it is moved against the flange 3, the latter serving as a stop while limiting play between the lens and stud. While the stud 10 is preferably fixed to the supporting arm, it could be removable therefrom and provided with a head that would seat in an opening in the arm, the inner end of the stud being engaged in the manner already described. It will be observed that the portion 2 of the supporting arm overlies and conceals from view the upper portion of the front surface of the lens adjacent to its upper edge, while flange 3 overlies and conceals from view the upper edge of the lens which is thus protected, while the studs and fastening devices are concealed from view, so that only the bridge, nose pads, temples and ornamented portions of the lens arms can be observed from the front, thus giving the effect of a rimless or semi-rimless frame with no visible means of fastening the lenses, and presenting an extremely neat and attractive appearance.

While the invention has been described with reference to the structure shown herein, it is not confined to any particular details, and this application is intended to cover such modifications or departures as may come within the purpose of the invention or the scope of the following claims.

I claim:

1. In a spectacle, a metal frame comprising a brace-bar type of supporting structure for use with lenses, each of said lenses having an opening adjacent to the nasal and temporal ends of the lens, said frame comprising rim sections of angle iron cross-sectional shape extending in a direction longitudinally of the upper edges of the lenses and having depending vertical portions following substantially the upper contour edge portions of the lenses and arranged in spaced relation to and overlying the upper portions of the anterior faces of the lenses and rearwardly extending angularly disposed lips following substantially the upper edges of the lenses and acting to cap the forward portions of the upper edges of the lenses, a bridge having end portions extending over and integrally attached to the nasal ends of said rim sections, said depending vertical portions terminating at their nasal and temporal ends in enlargements having transverse openings in substantial alignment with said openings in the lenses, studs loosely engaging said openings in the depending vertical portions of said rim sections and in the lenses and having heads engaging the anterior faces of said depending portions, said studs extending rearwardly through and fitting loosely in said openings in the lenses and threaded at their rear ends, fastening nuts engaging the threaded rear ends of the studs, and resilient washers located between the anterior faces of the lenses and said depending spaced vertical portions of the rim sections and between the posterior faces of the lenses and said nuts, said first named washers acting to completely space the anterior faces of the lenses from said depending vertical portions of the rim sections.

2. In a spectacle, a metal frame comprising a brace-bar type of supporting structure for use with lenses, each of said lenses having an opening adjacent to the nasal and temporal ends of the lens, said frame comprising rim sections of angle iron cross-sectional shape extending in a direction longitudinally of the upper edges of the lenses and having depending vertical portions following substantially the upper contour edge portions of the lenses and arranged in spaced relation to and overlying the upper portions of the anterior faces of the lenses and rearwardly extending angularly disposed lips following substantially the upper edges of the lenses and acting to cap the forward portions of the upper edges of the lenses, a bridge having end portions extending over and integrally attached to the nasal ends of said rim sections, said depending vertical portions terminating at their nasal and temporal ends in enlargements having transverse openings in substantial alignment with said openings in the lenses, studs loosely engaging said openings in the depending vertical portions of said rim sections and in the lenses and having heads engaging the anterior faces of said depending portions, said studs extending rearwardly through and fitting loosely in said openings in the lenses and threaded at their rear ends, fastening nuts engaging the threaded rear ends of the studs, and resilient washers located between the anterior faces of the lenses and said depending spaced vertical portions of the rim sections and between the posterior faces of the lenses and said nuts, said first named washers acting to completely space the anterior faces of the lenses from said depending vertical portions of the rim sections, the heads on said studs being countersunk in the vertical portions of the rim sections and lying flush with the anterior surfaces of the vertical portions.

FREDERICK H. SODEN.

REFERENCES CITED

The following references are of record in the file of this patent:

UNITED STATES PATENTS

| Number | Name | Date |
|---|---|---|
| D. 92,317 | Reynolds | May 22, 1934 |
| 2,099,748 | Mertens | Nov. 23, 1937 |
| 2,123,385 | Smith | Sept. 12, 1938 |
| 2,173,016 | Holmes | Sept. 12, 1939 |
| 2,180,820 | Gaspari | Nov. 21, 1939 |
| 2,231,256 | Dechau | Feb. 11, 1941 |
| 2,240,725 | Styll | May 6, 1941 |
| 2,256,502 | Splaine | Sept. 23, 1941 |
| 2,290,389 | Slotsky | July 21, 1942 |
| 2,301,287 | Kirk et al. | Nov. 10, 1942 |
| 2,372,059 | Cook | Mar. 20, 1945 |